United States Patent Office 3,422,926
Patented Jan. 21, 1969

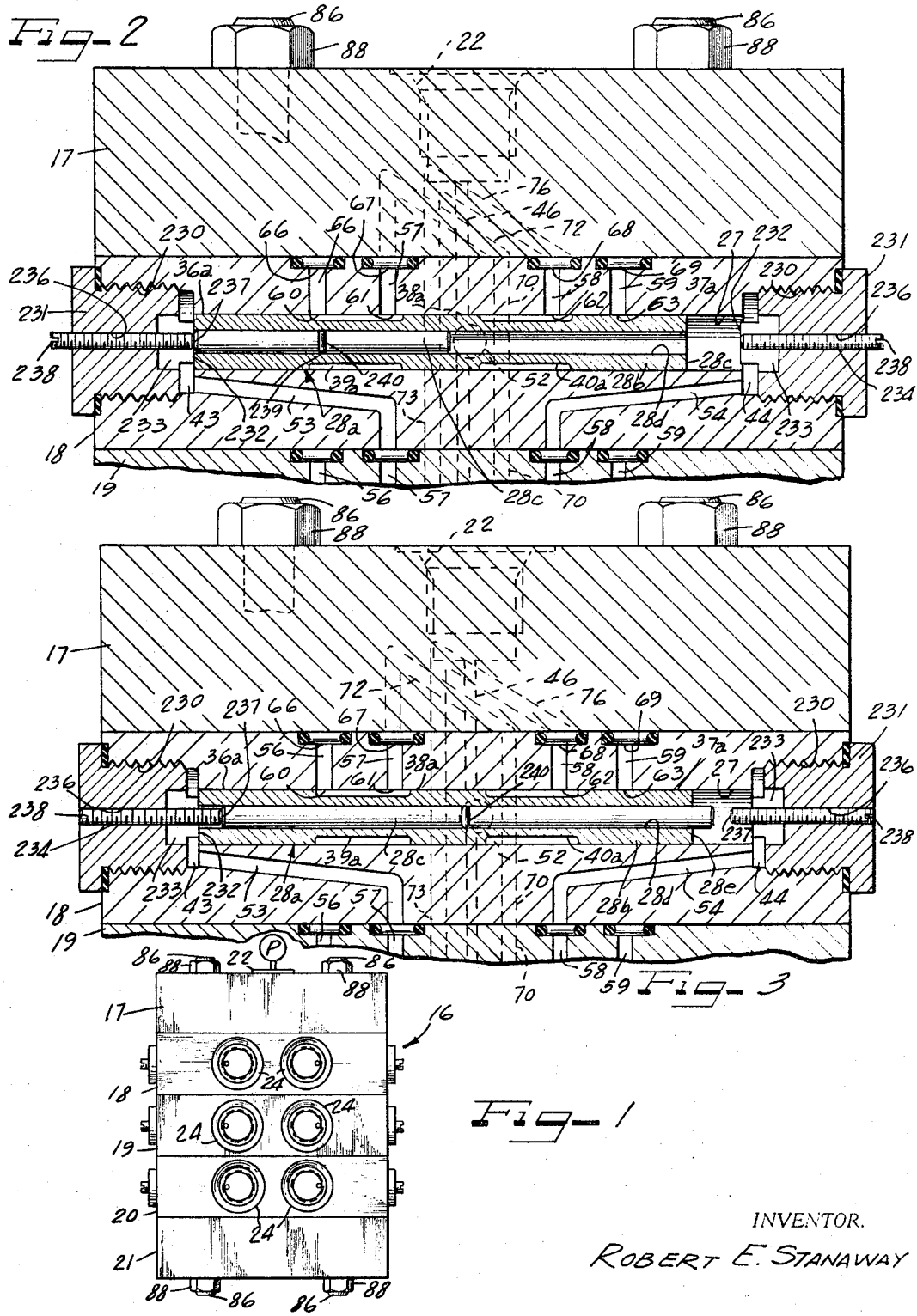

3,422,926
VARIABLE DISCHARGE LUBRICANT DISTRIBUTOR
Robert E. Stanaway, Orchard Park, N.Y., assignor to Houdaille Industries, Inc., Buffalo, N.Y., a corporation of Michigan
Filed Dec. 29, 1966, Ser. No. 605,773
U.S. Cl. 184—7          15 Claims
Int. Cl. F16n 25/02; F01b 9/02; F01b 7/20

ABSTRACT OF THE DISCLOSURE

A cycling lubricant distributor adapted for connection to a single pressurized-lubricant line to distribute selected charges of lubricant to diverse points of use and having a plurality of cylinders and a plunger assembly for each cylinder comprising an outer centrally bored piston, an inner piston in the bore of said outer piston and means for selectively varying the stroke of the inner piston to vary the charges of lubricant distributed by the plunger assembly.

Cross-reference to related application

This invention involves an improvement in the plunger assembly of the cycling lubricant distributor disclosed and comprehensively described in S. E. Leese et al. U.S. Patent No. 3,219,146 which issued on Nov. 23, 1965, and which is assigned to the assignee of this application, and the drawing and specifications of said patent are herein completely incorporated by reference.

Background of the invention

This invention relates generally to the field of lubrication and to a more particular field wherein a plurality of lubrication points are supplied with lubricants in successive charges from a single pressurized-lubricant fed distributor and wherein the sizes of the charges to the diverse points of use can be varied selectively.

Lubricant distributors of the automatically cycling type are known in the art, as witness the aforementioned Leese Patent No. 3,219,146. The advantages of this type lubricant distributor for supplying lubricant under pressure to multiple points of use such as bearing surfaces are many and varied. One important advantage is that the lubricant supplied to the distributor need be pumped in only one direction, as contrasted with the reverse-flow distributors known in the art. Another advantage resides in their relative simplicity and economy in design and construction. Still another advantage inherent in this type distributor is that each point of use receives its lubricant charge in order of the other points of use. The skipping of a lubricant charge to one of the bearing surfaces or the like due to malfunction of the distributor is precluded.

A deficiency of such known distributors, however, is the inability to easily vary the sizes of the lubricant charges. Although on the surface it would appear that the mere provision of means for varying the strokes of the plungers would suffice, this expediency is less than satisfactory, since a consistency in the sizes of the lubricant charges to any of the points of use requires a constant stroke of the plungers or pistons. This is due to the necessity of uniformity in the movement of valving surfaces integral with the plungers, particularly at higher lubricant pressures, as fully explained in the aforementioned Leese patent. The present invention is addressed primarily to the problem of overcoming this deficiency.

Summary of the invention

In a broad sense the present invention involves the provision of means for varying the effective stroke or displacement of the plunger without varying the movement of the valving members or surfaces formed integrally therewith. Thus the invention confers the ability to selectively vary the sizes of the lubricant charges while maintaining consistency of size when once selected.

In a more specific sense the invention contemplates, as a substitution for the solid plungers previously known in the art, a plunger which comprises an outer piston having the valving surfaces formed thereon and movable reciprocally within a cylinder between stops defining the limiting end positions of the piston, a longitudinal bore extending completely through the outer piston, an inner piston slidably reciprocally carried within the bore of the outer piston and means at the ends of the cylinder for providing axially adjustable stops defining limiting end positions of the inner piston.

The limiting end positions of the outer piston are fixed, and thus this piston moves a fixed and predetermined distance for each stroke. The valve members or surfaces formed thereon, by virtue of consistency in movement, operate in the same uniform manner during each stroke of the outer piston.

The limiting end positions of the inner piston are adjustable, however, and a variation in the setting of these stops has the effect of varying the sizes of the lubricant charges. If the inner piston is longer than the outer piston, the size of the charge can be reduced from that which would be provided by a solid prior art piston having a comparable stroke. On the other hand, if the inner piston is shorter than the outer piston, the size of the charge can be increased from the size which would be provided with a solid prior art piston.

It is, therefore, an object of the present invention to confer upon a cycling lubricant distributor a selective adjustability enabling the sizes of the charges of lubricant distributed thereby to be varied.

Another object is to enable the sizes of the charges to be varied without reducing uniformity of the charge sizes when once selected.

Another object is to enable the lubricant charges to be adjusted to a size or quantity greater than or less than the size of the charges which result from the utilization of solid plungers, that is, a charge equal to the displacement of the solid plunger.

The invention features a plunger assembly which comprises a hollow piston or shell and a solid piston reciprocally carried within the bore of the hollow piston. The various lands, grooves, valving surfaces and the like which are formed on the periphery of the plungers of the aforesaid Leese et al. patent are formed on the periphery of the outer hollow piston.

The invention also features a pair of fixed stops which serve as the limiting end positions of the outer piston, and a pair of adjustable stops axially aligned with the inner piston so that the limiting end positions of the inner piston can be varied.

Another salient feature resides in the provision of an O-ring in the bore of the outer piston which serves as a seal between the wall of the bore and the inner piston.

Many other features, advantages and additional objects of the present invention will become manifest to those versed in the art upon making reference to the detailed description which follows and the accompanying sheets of drawings, in which preferred structural embodiments incorporating the principles of the present invention are shown by illustrative example only.

Brief description of the drawing

FIGURE 1 is a front elevational view of a cycling lubricant distributor constructed in accordance with the principles of the present invention.

FIGURE 2 is an enlarged fragmentary vertical sectional view of a portion of the distributor shown in FIG- URE 1 and showing certain parts in elevation. This figure illustrates one embodiment of a plunger assembly contemplated in accordance with this invention.

FIGURE 3 is similar to FIGURE 2 but illustrates another embodiment of the plunger assembly.

*Description of the preferred embodiments*

Parts shown in the drawings which are similar to those shown and described in Leese et al. Patent No. 3,219,146 are assigned similar reference characters for ease in understanding the present invention and in utilizing the disclosure of the patent, incorporated herein by reference.

Referring to FIGURE 1 a cycling lubricant distributor embodying the principles of the present invention is shown generally at reference numeral 16 wherein is illustrated a block-unit type cycling lubricant distributor comprising an inlet block-unit 17, intermediate block-units 18–20 and an end block-unit 21.

A lubricant pump indicated at P is connected to a main inlet 22 in the inlet block-unit 17 for supplying pressurized lubricant to the distributor 16. A pair of outlets 24, 24 are provided in each of the intermediate block units 18–20 and are connected respectively by means of suitable discharge conduit to diverse points of use such as machine bearings or the like. The block units 17–21 are stacked together in side-by-side relation and maintained in assembled relation by means of a plurality of studs 86 which extend completely through the distributor 16 through aligned bores formed in the respective block-units. The studs 86 are threaded at the ends to receive assembly nuts as indicated at 88.

Referring to FIGURES 2 and 3, cylinder 27 is formed in each of the intermediate block units 18–20. An inlet port 52 is formed in the walls of each of the cylinders 27 in communication with a main inlet passageway 46 which extends through the inlet block-unit 17 and all of the intermediate block-units 18–20. Pressurized lubricant is delivered to the cylinders 27 through the main inlet 22, the main inlet passageway 46 and the respective inlet ports 52.

Also formed in each of the intermediate block-units 18–20 are two pairs of spaced parallel vertically extending connecting passageways indicated at 56–59. The connecting passageways open respectively at one end to transfer ports 66–69 and at an opposite end to connecting ports 60–63 so-called two-way passageways 53 and 54 are also formed in each of the intermedate block-units 18–20 and communicate with chambers 43 and 44 formed at opposite ends of the cylinders 27 and enclosed in part by end plugs 231, 231 which are threaded into complementarily threaded side walls 230, 230 of the chambers 43 and 44.

A cross-over passageway 70 also extends upwardly through all of the intermediate block units and communicates with a V-shaped portion 72 formed in the inlet block-unit 17. Another V-shaped portion 76 is provided in the inlet block 17 and communicates with another cross-over passageway 73 which extends through all of the intermediate block-units 18–20.

The function of the various flow passageways disclosed herein as well as the function of additional passageways formed in the distributor 16 is fully described in the aforementioned Leese et al, patent and therefore will not be described herein in the interest of brevity.

In each of the cylinders 27 is reciprocally disposed a plunger assembly indicated generally at 28a which comprises a hollow shell or outer piston 28b and a solid inner piston 28c reciprocally disposed within a bore 28d of the outer piston 28b. The outer periphery of the outer piston 28b comprises end lands 36a and 37a and a center land 38a. Also formed therein between the end lands 36a and 37a and 38a are groove portions 39a and 40a.

The function of the lands 36a–38a is similar to the function of lands 36–38 of the aforementioned Leese et al. patent, and the function of the groove portions 39a and 40a is identical to the function of groove portions 39 and 40 of the Leese et al. patent.

The outer piston 28b of each of the plunger assemblies 28a is reciprocally movable within its respective cylinder 27 between a pair of spaced limiting end positions formed by a pair of stops which comprise inner end walls 232, 232 of the plugs 231, 231. A transverse groove or slot 233 is formed in each of the end plugs 231 for communicating the cylinders 27 with the chambers 43 and 44.

In the prior art arrangements the plunger assemblies 28a comprise a solid piston as indicated at 28, for example, in the aforementioned Leese et al. patent. As the pistons move from one limiting end position to another the size of the lubricant charge distributed by such movement is equal to the displacement of the piston, that is, the cross-sectional area of the cylinder 27 times the stroke of the piston.

In order to vary the distributed charges of the prior art devices it is necessary to replace the pistons with pistons of different lengths in order to vary the piston strokes. The expediency of merely adjusting the location of the piston stops without changing the length of the piston is not satisfactory since by doing so not only are the locations of the various land and groove portions of the piston at the limiting end positions of the piston changed, but more importantly the location of the inlet ports 52 with respect to the groove portions of the piston change. As fully explained in said Leese et al. patent consistency in the quantity of the lubricant charges depends to a very great extent, particularly at higher lubricant pressures, in certain critical relationships between the relative locations of the inlet ports 52 and the groove portions of the piston as the piston approaches its limiting end position.

In addition, however, replacement of the pistons with pistons of different lengths is not desirable since for each change in the size of the lubricant charge a piston of a different length would have to be provided. Even the time consumed in replacing the pistons for each desired change in the size of the lubricant charge is substantial.

In accordance with the present invention, however, the size of each charge of lubricant delivered from each end of each cylinder can be adjusted not only easily but independently of the size of each of the other charges. Thus there is provided in each of the end plugs 231 a threaded stud 234 received in a complementarily threaded bore 236. The stud 234 is axially aligned with the bore 28d of the outer piston 28d. An inner end 237 of the stud 234 provides a stop for the inner solid piston 28c and an outer end 238 is provided with a slot or the like for easy manual adjustment of the stud by means of a screwdriver or similar tool.

In the embodiment shown in FIGURE 2 the length of the inner solid piston 28c is considerably less than the length of the outer piston 28b. In operation, assume that chamber 43 is in communication with pressurized lubricant. The outer and inner pistons 28b and 28c then move in unison rightwardly as viewed in FIGURE 2. The right end of cylinder 27 as well as the right end of the bore 28d are filled with lubricant, and as the pistons 28b and 28c begin to move rightwardly this lubricant is discharged through chamber 44 and passageway 54 to its respective outlet 24.

Rightward movement of the outer piston 28b continues until an end wall 28e thereof moves into abutting engagement with its stop, that is, the inner end wall 232 of the end plug 231. The inner piston 28c, however, continues to move rightwardly (and relative to the outer piston 28b) until it abuts the outer end 237 of its respective stop or stud 234.

Thus the charge of the lubricant distributed for each stroke of the plunger assembly 28a is equal not only to the displacement of the outer piston 28b but also to the stroke of the inner piston 28c times its cross-sectional area.

In the embodiment shown in FIGURE 3 the inner piston 28c may be longer than the outer piston 28b and thus the total charge of lubricant delivered per stroke of the plunger assembly 28a may be less than the displacement of the outer piston 28b in the embodiments of both FIGURES 2 and 3 the lubricant charges delivered from each end of the respective cylinders 27 can be changed merely by adjusting the setting of the respective threaded studs 234 to vary the limiting end positions of the inner pistons 28c.

In order to substantially prevent leakage of lubricant between the inner pistons 28c and the walls of the bores 28d an O-ring as indicated at 239 is provided within the bore 28d to form a seal between the inner piston and the bore wall. In the embodiments illustrated the O-rings 239 are disposed in peripheral grooves 240 formed in the inner pistons 28c intermediate its ends. When the sizes of the O-rings and the materials by which they are constituted are selected so as to permit relative axial movement between the inner and outer pistons but yet virtually eliminate leakage past the inner piston. Close machining tolerances between the walls of the bores 28d and the outer walls of the pistons 28c to prevent leakage by a metal-to-metal fit are thus obviated.

Although minor modifications might be suggested by those versed in the art, it should be understood that I wish to embody within the scope of the patent warranted hereon all such modifications as reasonably come within the scope of my contribution to the art.

I claim as my invention:

1. In a cyclic lubricant distributor including a block having a plurality of cylinders formed therein each having a pair of outlets, passageway means connecting the ends and the outlets of each cylinder to another cylinder, a main inlet passageway for supplying lubricant under pressure, an inlet port in each cylinder communicating with the main inlet passageway, a plunger in each cylinder arranged to be automatically shifted reciprocally back and forth a full stroke between a pair of spaced stops defining limiting end positions, and land portions on the plungers normally covering the inlet ports but movable thereacross to uncover the ports to alternately connect the cylinders at one end to lubricant under pressure and to connect the cylinders at their opposite ends to outlets in other cylinders through the passageway means, the improvement wherein one of the plungers comprises, an outer piston having the land portions formed therein and movable reciprocally between the stops defining the limiting end positions, a longitudinal bore extending completely through said outer piston, an inner piston slidably reciprocally carried within said bore, and means at the ends of its respective cylinder for providing stops defining limiting end positions for said inner piston.

2. The lubricant distributor as defined in claim 1 wherein said stop means for said inner piston is independent of the stops for said outer piston.

3. The lubricant distributor as defined in claim 2 wherein said inner piston stop means comprises a pair of spaced stops situated respectively at the ends of the cylinder and adjustable axially with respect to the cylinder to vary the limiting end positions of said inner piston.

4. The lubricant distributor as defined in claim 2 wherein said adjustable inner piston stops are also axially adjustable relative to the stops defining the limiting end positions of said outer piston.

5. The lubricant distributor as defined in claim 2 wherein said inner piston is of a length different from the length of said outer piston.

6. The lubricant distributor as defined in claim 5 wherein said inner piston is shorter than said outer piston.

7. The lubricant distributor as defined in claim 5 wherein said inner piston is longer than said outer piston.

8. The lubricant distributor as defined in claim 2 and including an O-ring housed within and extending radially to the wall of said bore of said outer piston to provide a seal between said inner piston and said bore.

9. The lubricant distributor as defined in claim 8 wherein said O-ring is mounted on said inner piston.

10. The lubricant distributor as defined in claim 9 and including a peripheral groove formed in said inner piston for receiving said O-ring.

11. For use in a sequentially cycling lubricant distributor adapted for connection to a single pressurized-lubricant line to distribute selected charges of lubricant to diverse points of use and including a plurality of plunger assemblies each having a plunger movable reciprocally in a cylinder to distribute a charge of lubricant with each movement in each direction in an amount equal to the displacement of the plunger, an improved plunger assembly for selectively varying the effective displacement of the plunger and the amounts of the distributed charges of lubricant comprising, an outer piston adapted to be carried within a cylinder for reciprocal movement therewithin between limiting end positions, means forming a bore in said outer piston extending longitudinally the entire length of said outer piston, an inner piston slidably carried within said bore for reciprocal movement between limiting end positions, and adjustable stop means for selectively varying the limiting end positions of said inner piston, whereby the effective displacement of the plunger assembly and the charge of lubricant distributed with each movement of the inner and outer pistons from one of their respective limiting end positions to the other can be varied by adjusting said inner piston stop means.

12. The plunger assembly as defined in claim 11 wherein said inner piston stop means comprises a pair of threaded studs aligned axially with said bore of said outer piston for abutting the ends of said inner piston.

13. The plunger assembly as defined in claim 11 and including an O-ring in the bore of said outer piston for providing a seal between the wall of said bore and the inner piston.

14. The plunger assembly as defined in claim 11 wherein the length of said inner piston is less than the length of said outer piston for providing an effective displacement of said plunger assembly which is greater than the area of the cylinder times the stroke of said outer piston.

15. The plunger assembly as defined in claim 11 wherein the length of said inner piston is greater than the length of said outer piston for providing an effective displacement of said plunger assembly which is less than the area of the cylinder times the stroke of said outer piston.

References Cited

UNITED STATES PATENTS

| 2,526,568 | 10/1950 | Leonard. |
| 2,766,847 | 10/1956 | Harter. |
| 3,052,376 | 9/1962 | Fogg _____ 222—309 X |

FOREIGN PATENTS

| 1,103,695 | 3/1961 | Germany. |

HOUSTON S. BELL, Jr., *Primary Examiner.*

U.S. Cl. X.R.

92—13, 51; 103—158; 222—309